United States Patent [19]

Steinetz et al.

[11] Patent Number: 5,076,590
[45] Date of Patent: Dec. 31, 1991

[54] HIGH TEMPERATURE, FLEXIBLE PRESSURE-ACTUATED, BRUSH SEAL

[75] Inventors: Bruce M. Steinetz, Broadview Heights; Paul J. Sirocky, Middleburg Heights, both of Ohio

[73] Assignee: The United States of America, as represented by the Administrator of the National Aeronautics and Space Administration, Washington, D.C.

[21] Appl. No.: 617,752

[22] Filed: Nov. 26, 1990

[51] Int. Cl.[5] .............................................. F16J 15/32
[52] U.S. Cl. ...................................... 277/53; 277/27; 239/127.1; 239/127.3
[58] Field of Search ................. 277/53, 27; 415/173:1, 415/173.2, 173.4, ; 239/127.1, 127.3

[56] References Cited

U.S. PATENT DOCUMENTS

| | | | |
|---|---|---|---|
| 885,032 | 4/1908 | De Ferranti | 277/53 |
| 2,878,048 | 3/1959 | Peterson | 288/2 |
| 4,159,828 | 7/1979 | Ostling et al. | 277/53 |
| 4,281,838 | 8/1981 | Persson | 277/53 |
| 4,358,120 | 11/1982 | Moore | 277/53 |
| 4,415,309 | 11/1983 | Atterbury | 277/53 |
| 4,595,207 | 6/1986 | Popp | 277/53 |
| 4,600,202 | 7/1986 | Schaeffler et al. | 277/53 |
| 4,781,388 | 11/1988 | Wohrl et al. | 277/53 |
| 4,809,990 | 3/1989 | Merz | 277/53 |
| 4,940,080 | 7/1990 | Reeves et al. | 277/53 |

FOREIGN PATENT DOCUMENTS

| | | | |
|---|---|---|---|
| 2344666 | 3/1974 | Fed. Rep. of Germany | 277/53 |
| 1049092 | 12/1953 | France | 277/53 |
| 1417969 | 12/1975 | United Kingdom | 277/53 |

Primary Examiner—William A. Cuchlinski, Jr.
Assistant Examiner—Daniel G. DePumpo
Attorney, Agent, or Firm—Gene E. Shook; John R. Manning; James A. Mackin

[57] ABSTRACT

A high temperature, flexible brush seal comprises a bundle of fibers or bristles held tightly together and secured at one end with a backing plate. The assembly includes a secondary spring-clip having one end anchored to the brush seal backing plate.

An alternate embodiment of the seal utilizes a metal bellows containing coolant holes. Another embodiment of the seal uses non-circular cross-sectional fibers which may be square, rectangular or hexagonal in cross section.

20 Claims, 3 Drawing Sheets

HIGH TEMPERATURE, FLEXIBLE PRESSURE-ACTUATED, BRUSH SEAL

ORIGIN OF THE INVENTION

The invention described herein was made by an employee of the United States Government, together with a contractor employee, performing work under a NASA contract and is subject to the provisions of Section 305 of the National Aeronautics and Space Act of 1958, Public Law 85-568 (72 Statute 435; 42 USC 2457).

TECHNICAL FIELD

This invention is concerned with an improved flexible thermal barrier seal for operation at high temperatures. The invention is particularly concerned with sealing gaps between movable engine panels and their adjacent engine sidewalls, typical of advanced ramjet-scramjet engines, as well as two-dimensional turbojet exhaust nozzles.

Gaps caused by pressure and thermal loads on the weight-minimized relatively compliant engine sidewalls of these hypersonic engines may be as much as 0.25 inch, which requires a very compliant (serpentine) seal to conform with the sidewall deformations. Complicating the seal's function is the requirement to articulate the engine panel and seal, wiping the seal over bowed engine sidewalls while the engine is operating. Articulation of the engine panel is required to optimize engine and vehicle performance.

Flowpath conditions within these engines are extreme with static gas temperatures ranging from 1200° F. to 5000° F. High pressure differentials up to 100 psi may be encountered, depending on engine configuration and axial flowpath position within each engine.

It is, therefore, a primary objective of the present invention to prevent these hot, pressurized flowpath gases containing hydrogen and oxygen from leaking past the movable engine panels to back engine cavities thereby causing loss of the engine or even the entire aircraft.

A further object of the invention is to provide a seal which conforms to expected engine sidewall distortions.

Another object of the invention is to provide a high temperature, flexible seal that can operate at temperatures up to about 2300° F.

BACKGROUND ART

U.S. Pat. No. 2,878,048 is concerned with a brush seal having straight, parallel, densely compacted strands. The seal utilizes a circularized metal back with a bristle material extending radially outward.

U.S. Pat. No. 4,595,207 is directed to a brush seal that is used between machine parts. The brush seal includes a holder and a plurality of bristles extending from the holder. The holder is supported on one of the machine parts so that the seal extends at an acute angle to the other machine parts.

U.S. Pat. No. 4,600,202 discloses a flexible brush type seal used between machine components in relative motion with respect to each other. The fibers may be clustered individually or bunched and kept together by processes such as soldering, sintering, or pressed in place using ceramic materials. The fibers can be composed of various metals, plastics and glass, glass-metals, or glass-ceramics.

U.S. Pat. No. 4,781,388 describes a brush seal for sealing spaced adjoining members capable of relative movement. The seal comprises a plurality of bristles, one end of which is secured to a clamp causing the bristles to fan outwardly.

U.S. Pat. No. 4,809,990 is directed to a brush seal for use in thermal turbomachines for sealing circumferential gaps. The bristles of the seal are made of ceramic fibers which are highly resilient, resistant to abrasion, and to hot oils and vapors.

U.S. Pat. application Ser. No. 441,672 which was filed for the present applicants by the NASA Administrator on Nov. 27, 1989, and issued as U.S. Pat. No. 5,014,917 on May 14, 1991, is directed to a high temperature, flexible, thermal barrier seal which comprises a high temperature outer sheathing with an inner core of densely packed, high temperature particles. The thermal barrier seal is preloaded lateral to its axis to maintain good sealing contact between the seal nose and the adjacent wall, as well as to ensure the seal follows the distorted sidewall.

U.S. Pat. application Ser. No. 610,879 which was filed for the present applicants by the NASA Administrator on Nov. 1, 1990, is concerned with a high temperature, flexible seal constructed of multiple layers of fibers having a uniaxial core over which helical fibers are wound. The fibers are of materials capable of withstanding high temperatures and are both left-hand and right-hand wound.

DISCLOSURE OF THE INVENTION

A high temperature, flexible brush seal constructed in accordance with the present invention comprises a bundle of fibers or bristles held tightly together and secured at one end with a backing plate. For application requiring near leak-tight performance the assembly uses a secondary spring-clip having one end anchored to the brush seal backing plate.

An alternate embodiment of the seal utilizes a metal bellows containing coolant holes. Another embodiment of the seal uses non-circular cross-sectional fibers which may be square, rectangular, or hexagonal in cross section.

BRIEF DESCRIPTION OF THE DRAWINGS

The objects, advantages, and novel features of the invention will be more fully apparent from the following detailed description when read in connection with the accompanying drawings wherein.

BEST MODE FOR CARRYING OUT THE INVENTION

Figure 1:
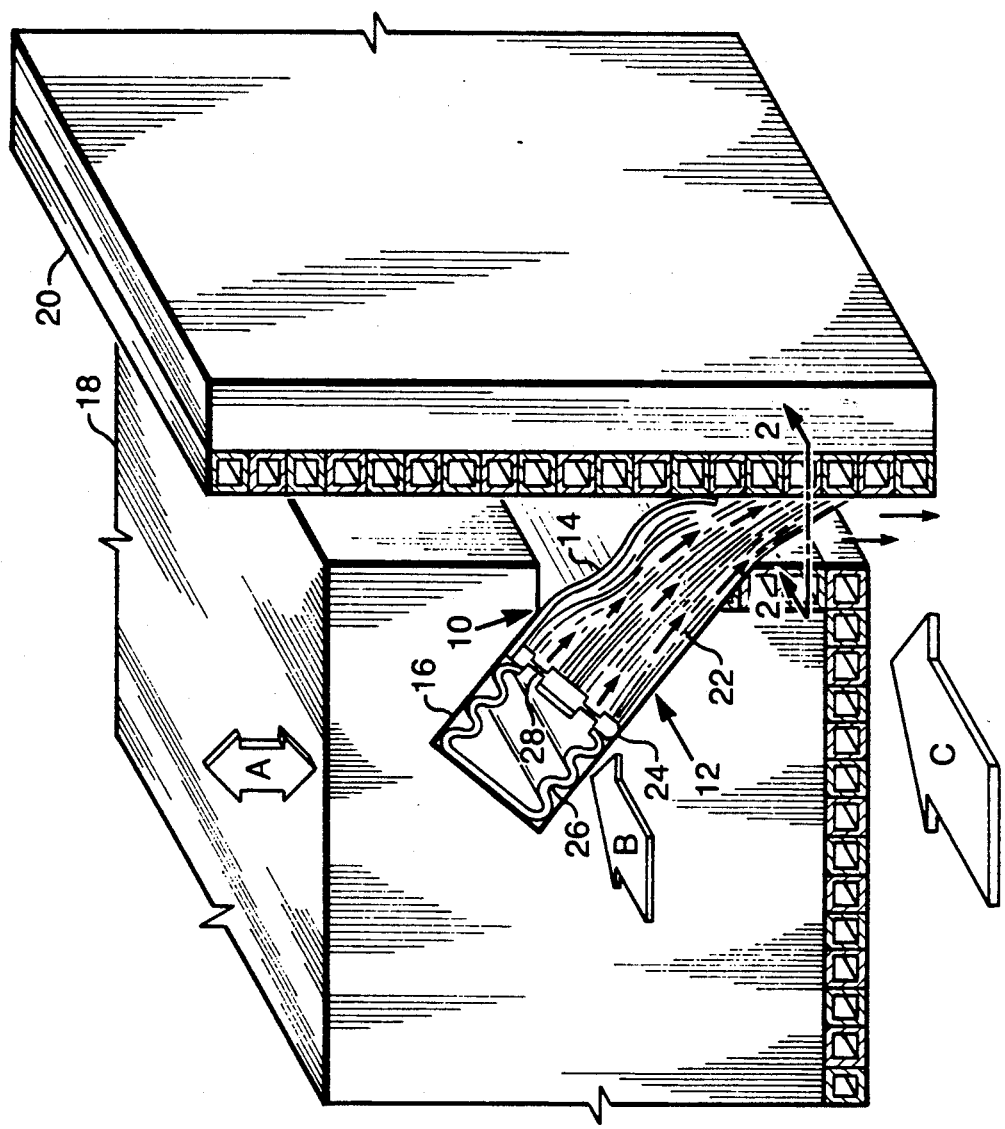
FIG. 1 is a perspective view of a high temperature, flexible brush seal constructed in accordance with the invention.

Referring now to the drawings there is shown in FIG. 1 a seal 10 comprising a brush packing 12 and a secondary spring-clip 14. Both the brush packing and the spring-clip are mounted in a closely mating seal channel 16 in a movable structural panel 18 for sealing the gap between this movable panel and an adjacent engine sidewall 20.

Figure 2:
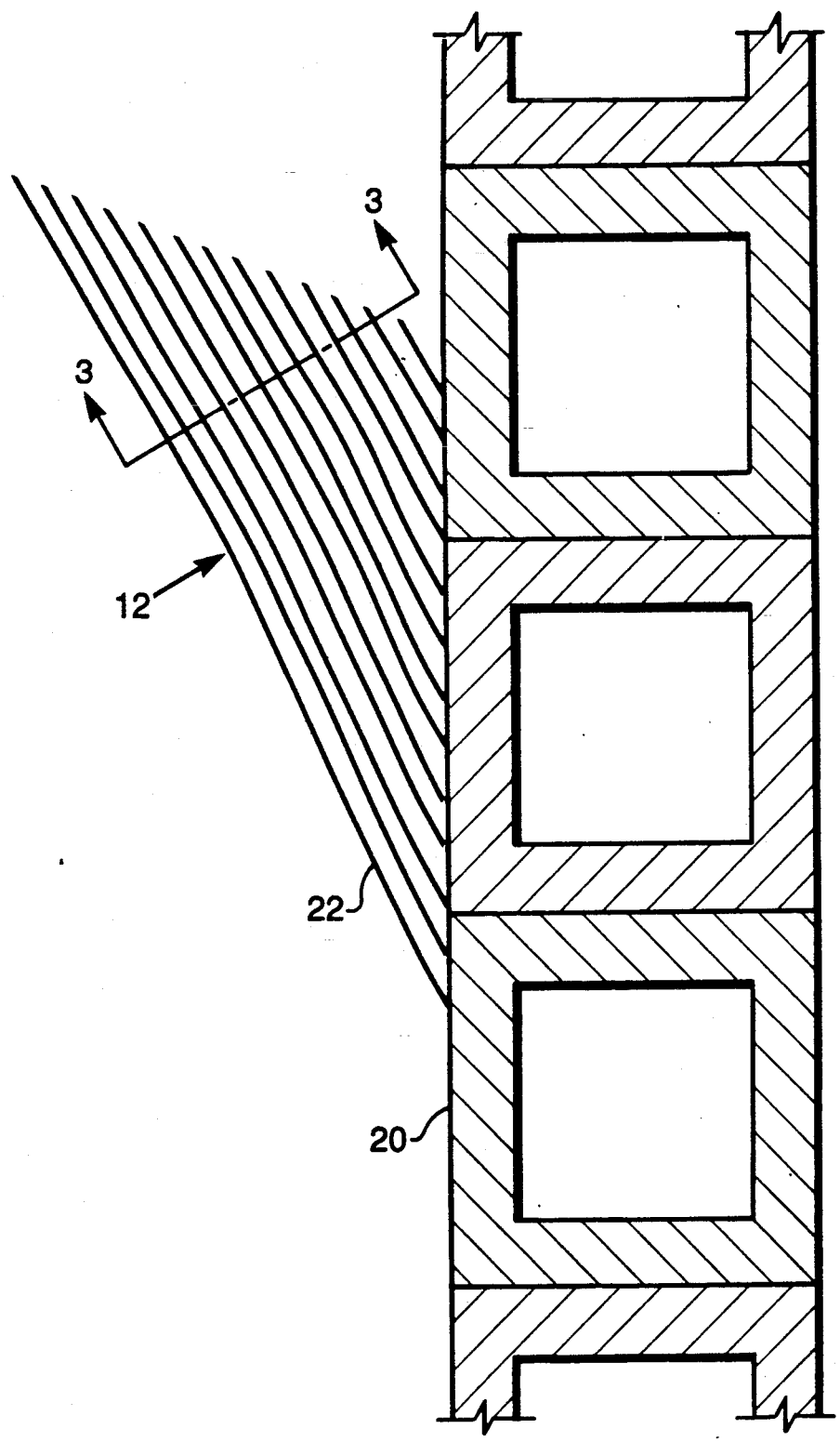
FIG. 2 is an enlarged view taken along the line 2—2 in FIG. 1.

As shown in both FIGS. 1 and 2 the seal 10 comprises a bundle of fibers or bristles 22, held tightly together so as to achieve high fiber packing densities and minimize seal permeability and leakage. In order to improve the brush packing density, the brush seal fibers 22 can be tied together or interleaved with other fiber strands along the seal's axial direction, that is, in the direction of the seal's length. A hybrid or braided construction such as this will improve the seal's ability to sustain the supersonic hot gas flow tangent to the exposed edge of the seal as well as the punishing seal sliding conditions and the high engine pressures.

Figure 3:
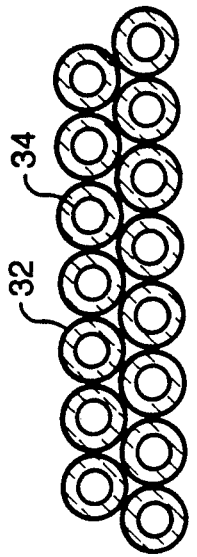
FIG. 3 is an enlarged section view taken along the line 3—3 in FIG. 2 showing the circular cross section of the fibers in the brush seal of the preferred embodiment.

The fibers 22 of the brush seal preferably have circular cross sections as shown in FIG. 3. These fibers 22 are mounted and secured at one end to a backing plate 24. It is contemplated that the fibers 22 may be cast or molded into the backing plate 24.

The brush packing is supported in the seal channel 16 along the side of the panel 18 that is to be sealed. The brush extends out from this panel to contact and seal against the sidewall 20. The angle formed between the seal 10 and the sidewall 20 is such that the pressure acts to improve the sealing contact between the seal 10 and the sidewall 20.

Integral with the brush seal 10 is the positive pressure barrier formed by the spring-clip 14 which has one end anchored to the brush seal backing plate 24. The other end of the spring-clip 14 is in sealing contact with the sidewall 20. The spring-clip 14 is on the low temperature, low pressure side of the brush seal 10 and forms a positive fluid seal between the two panels 18 and 20.

The brush packing 12 which is closer to the flow of hot gases comprises ceramic fibers 22 which act to insulate the metal spring-clip 14. The angle formed between the spring-clip 14 and the sidewall 20 is normally the same as the angle made by the brush packing 12 and the sidewall 20. The engine pressure functions to improve the sealing contact between the spring-clip 14 and the sidewall 20. In order to accommodate the distortions of the sidewall 20, the spring-clip 14 can be axially segmented with adjacent spring-clips overlapping.

The materials chosen for the brush packing 12 may be any of the high temperature engineering fibers, such as alumina-boria-silicate which is known commercially as Nextel. Another such material is silicon-carbide which is sold commercially as Nicalon. These fibers remain flexible when hot and provide high operating temperatures up to about 2300° F. in the case of Nextel. This minimizes the need for active coolant of the seal 10.

Materials chosen for the brush-seal backing plate 24 and spring clip 14 are any of the high temperature nickel-,cobalt-,or iron-based materials.

It will be apparent to one skilled in the art this seal has the advantage over other seals in that the high temperature engineering fibers enable the seal to operate at temperatures 800° F. higher than the prior art rotating shaft metal-brush seals. Another advantage is that the angle made between the brush packing seal 10 and the sidewall panel 20 is such that the engine pressure actually increases the preload and improves the sealing capability of the seal.

Still another advantage of this seal is that the spring clip 14 forms a positive seal between the two panels 18 and 20 which is beyond the capability of metal-brush seals that merely form a first stage, porous pressure barrier.

ALTERNATE EMBODIMENTS OF THE INVENTION

Figure 4:
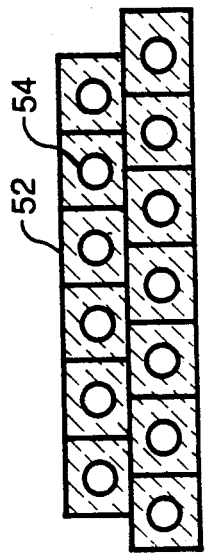
FIG. 4 is an enlarged section view similar to FIG. 3 showing the cross section of circular fibers with central cooling passages used in an alternate embodiment.

There are several alternate embodiments of the invention. In one embodiment circular fibers 32 with central cooling passages 34 shown in FIG. 4 are substituted for the more common solid circular fibers 22 shown in FIG. 3. Fibers such as these are used for extremely high temperature applications where it is necessary to integrally cool the seal through the longitudinally extending passages 34.

Figure 5:
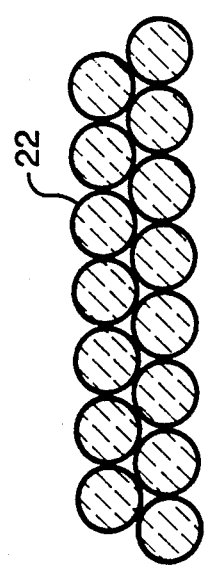
FIG. 5 is an enlarged section view similar to FIG. 3 showing the cross section of rectangular fibers used in another alternate embodiment.

In another embodiment, non-circular cross section fibers 42 as shown in FIG. 5 are used in place of the circular cross section fibers 22 shown in FIG. 3. By way of example, rectangular fibers 42 increase the theoretical packing densities from 78% to nearly an ideal 100%. This significantly reduces brush seal permeability.

Figure 6:
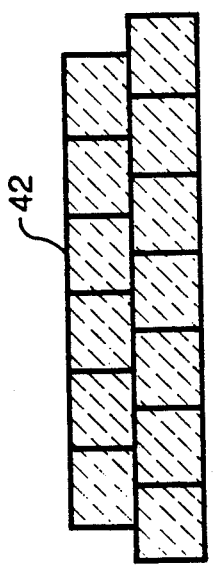
FIG. 6 is an enlarged section view similar to FIG. 3 showing the cross section of rectangular fibers with central cooling passages used in an alternate embodiment.

In another embodiment, rectangular fibers 52 with central cooling passages 54 shown in FIG. 6 are substituted for the more common solid circular fibers 22 as shown in FIG. 3. Fibers such as these are used for extremely high temperature applications where it is necessary to integrally cool the seal through the longitudinally extending passage 54.

Figure 7:
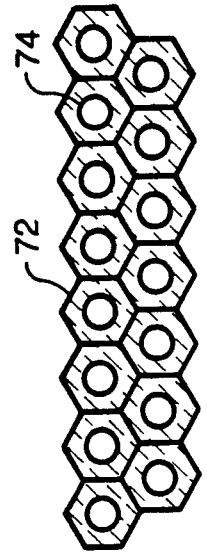
FIG. 7 is an enlarged section view similar to FIG. 3 showing the cross section of hexagonal fibers used in an alternate embodiment wherein the fibers are arranged in a tessellated configuration.

In another embodiment, hexagonal cross section fibers 62 shown in FIG. 7 arranged in a tessellated configuration are used in place of the circular cross section fibers 22 shown in FIG. 3. Hexagonal fibers not only improve theoretical packing densities to 100%, but also pack better than rectangular fibers under sliding and vibrational seal conditions.

Figure 8:
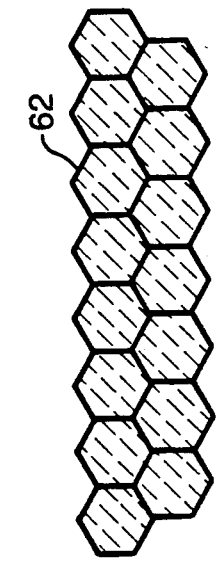
FIG. 8 is an enlarged section view similar to FIG. 3 showing the cross section of hexagonal fibers with central cooling passages used in an alternate embodiment having a tessellated configuration.

In another embodiment hexagonal fibers 72 with central cooling passages 74 shown in FIG. 8 are substituted for the more common solid circular fibers 22 shown in FIG. 3. Fibers such as these are arranged in a tessellated configuration and used for extremely high temperature applications where it is necessary to integrally cool the seal through the longitudinally extending passages 74.

Another alternate embodiment of the invention incorporates a metal bellows 26 shown in FIG. 1. This bellows which is pressurized by a gas flowing in a direction of the arrow B which actually preloads the seal 10 where by resiliently maintaining the fibers 22 in contact with the adjacent sidewall 20 where either high pressure temperature differentials or distortions warrant its use. It is contemplated that an advanced design of such a bellows 26 could incorporate film coolant holes 28 in its nose to provide film coolant for the brush seal 10 and the spring clip 14 in regions where ambient temperatures are above the maximum seal operating temperatures. The bellows 26 may be modified to serve as a manifold for delivering higher pressure coolant gas at axial engine stations where the engine temperatures are higher.

It is contemplated that an inert purge coolant gas, such as helium, flowing laterally outward through the seal 10, as indicated by the small arrows in FIG. 1, would serve two important functions: The gas cools the seal 10, and it provides a positive purge of an inert gas to prevent leakage of potentially explosive hydrogen-oxygen mixtures to the back side engine cavities.

It will be appreciated that the main elements of the seal shown in FIGS. 1 and 2 including the fiber material, fiber sizes and cross-sections, lay-up of the fibers, the axial braiding method, seal backing plate, spring clips, cooling method, and the lateral preload are parameters that can be optimized for given seal applications.

In addition to the uses of the seal shown in FIG. 1 it is contemplated that the seals can be used in hypersonic vehicle airframe seals, such as landing gear door seals, elevon control surface seals, rudder control surface seals, body-flap control surface seals, forward canard control surface seals, and crew acess door seals.

It is further contemplated that the disclosed seal can be used in high temperature furnace expansion joints and the like where furnace panel growth is encountered. The seal may also be used in rocket motor casings or any other application requiring non-asbestos, high temperature gaskets. The disclosed high temperature seal can also be used to seal joints of ceramic heat exchangers of advanced recuperators being developed to extract usable energy from high temperature flue-gas up to 2300° that would otherwise be lost up the stack.

While several embodiments of the invention have been shown and described, it will be appreciated that various structural modifications may be made to these seals without departing from the spirit of the invention or the scope of the subjoined claims.

I claim:

1. Pressure-actuated apparatus for sealing a gap between a moveable panel and an adjacent sidewall spaced therefrom to inhibit leakage of gases from a high temperature, high pressure side to a low temperature, low pressure side, said apparatus comprising
   a plurality of fibers in said gap forming a brush seal, means for holding said fibers tightly together,
   means for mounting said fibers on said moveable panel, and
   spring clip means having one end operably connected to said mounting means and an opposite end in engagement with said adjacent sidewall thereby forming a positive pressure barrier, said spring clip means being in engagement with said brush seal on said low temperature, low pressure side so that pressure from said high temperature, high pressure side improves the sealing contact between the spring clip means and the sidewall.

2. Sealing apparatus as claimed in claim 1 wherein the positive pressure barrier comprises a metal spring-clip.

3. Sealing apparatus as claimed in claim 1 wherein the fiber mounting means comprises a backing plate.

4. Sealing apparatus as claimed in claim 3 wherein the backing plate anchors the spring clip means.

5. Sealing apparatus as claimed in claim 1 including resilient means for maintaining said fibers in contact with said adjacent sidewall.

6. Sealing apparatus as claimed in claim 1 wherein the movable panel and adjacent sidewall are on a hypersonic engine.

7. Sealing apparatus as claimed in claim 6 wherein the hypersonic engine is a ramjet engine and the surface of the sidewall is distorted during operation of the same.

8. Sealing apparatus as claimed in claim 6 wherein the hypersonic engine is a scramjet engine and the surface of the sidewall is distorted during operation of the same.

9. Sealing apparatus as claimed in claim 1 wherein the fibers have noncircular cross sections.

10. Sealing apparatus as claimed in claim 9 wherein the fibers have rectangular cross sections.

11. Sealing apparatus as claimed in claim 10 wherein the fibers have longitudinally extending cooling passages therein for cooling the same.

12. Sealing apparatus as claimed in claim 9 wherein the fibers have hexagonal cross sections.

13. Sealing apparatus as claimed in claim 12 wherein the fibers are arranged in a tessellated configuration.

14. Sealing apparatus as claimed in claim 12 wherein the fibers have longitudinally extending cooling passages therein for cooling the same.

15. Sealing apparatus as claimed in claim 1 wherein the fibers have circular cross sections.

16. Sealing apparatus as claimed in claim 15 wherein the fibers have longitudinally extending cooling passages therein for cooling the same.

17. In a pressure-actuated flexible seal for inhibiting leakage of gas from a high temperature, high pressure side to a low temperature, low pressure side through a gap between a moveable panel and an adjacent sidewall when said sidewall becomes significantly distorted in which passage of said gas is blocked by a plurality of fibers in said gap forming a brush seal, the improvement comprising
   a channel along the side of said moveable panel adjustment to said gap for mounting said fibers tightly together in contact with said sidewall and
   spring clip means mounted in said channel adjacent to said fibers on the low temperature, low pressure side with a portion thereof in engagement with said sidewall thereby forming a positive pressure barrier whereby pressure from the high temperature, high pressure side improves the sealing contact between the spring clip means and the sidewall.

18. A flexible seal as claimed in claim 17 including resilient means for maintaining said fibers in contact with said adjacent sidewall.

19. A flexible seal as claimed in claim 18 including a bellows in said channel for moving said fibers toward said adjacent sidewall.

20. A flexible seal as claimed in claim 17 wherein the fibers have circular cross sections.

* * * * *

UNITED STATES PATENT AND TRADEMARK OFFICE
CERTIFICATE OF CORRECTION

PATENT NO. : 5,076,590

DATED : December 31, 1991

INVENTOR(S) : Bruce M. Steinetz and Paul J. Sirocky

It is certified that error appears in the above-identified patent and that said Letters Patent is hereby corrected as shown below:

Column 6, line 44, cancel "adjustment" and insert --adjacent--

Signed and Sealed this

Thirtieth Day of March, 1993

Attest:

STEPHEN G. KUNIN

*Attesting Officer*  *Acting Commissioner of Patents and Trademarks*